United States Patent
Amagai et al.

(10) Patent No.: US 7,515,610 B2
(45) Date of Patent: *Apr. 7, 2009

(54) PACKET PROCESSING USING A MULTI-PORT MEMORY

(75) Inventors: Tatsuhiko Amagai, Tokyo (JP);
Mikiharu Yamashita, Tokyo (JP);
Tatsuo Aramizu, Tokyo (JP)

(73) Assignee: Juniper Networks, Inc., Sunnyvale, CA (US)

( * ) Notice: Subject to any disclaimer, the term of this patent is extended or adjusted under 35 U.S.C. 154(b) by 64 days.

This patent is subject to a terminal disclaimer.

(21) Appl. No.: 11/537,272

(22) Filed: Sep. 29, 2006

(65) Prior Publication Data

US 2007/0025380 A1 Feb. 1, 2007

Related U.S. Application Data

(63) Continuation of application No. 09/404,313, filed on Sep. 24, 1999, now Pat. No. 7,130,312.

(30) Foreign Application Priority Data

Sep. 29, 1998 (JP) ................................. 10-276161

(51) Int. Cl.
*H04L 12/28* (2006.01)
*H04L 12/56* (2006.01)

(52) U.S. Cl. ..................................................... 370/469

(58) Field of Classification Search ................. 370/389, 370/392, 412, 474, 469; 711/147, 149
See application file for complete search history.

(56) References Cited

U.S. PATENT DOCUMENTS

| | | | |
|---|---|---|---|
| 4,821,265 A | 4/1989 | Albal et al. | |
| 4,910,733 A | 3/1990 | Sommani et al. | |
| 5,303,344 A | 4/1994 | Yokoyama et al. | |
| 5,513,134 A | 4/1996 | Cooperman et al. | |
| 5,729,681 A | 3/1998 | Aditya et al. | |

(Continued)

FOREIGN PATENT DOCUMENTS

CH 99122470.1 9/1999

(Continued)

OTHER PUBLICATIONS

Siegmund, Gerd: "ATM-Die Technik" 3. Auflag, Hneidelber, HuthligVerlag, Titleblatt+Impressujm+S.347.

(Continued)

*Primary Examiner*—Kevin C Harper
(74) *Attorney, Agent, or Firm*—Harrity & Harrity, LLP

(57) ABSTRACT

A packet processing method for exchanging packet data through a plurality of layers is disclosed, that comprises the steps of storing the entire packet to a packet memory; and storing part of each packet of the packet data used in processes of a layer 2 processing portion and a layer 3 processing portion of the plurality of layers to a multi-port shared memory, the layer 2 processing portion and the layer 3 processing portion accessing the same memory space of the multi-port shared memory. In addition, a pipeline processing system is used so that when the layer 2 processing portion and the layer 3 processing portion access the shared memory, they do not interfere with each other.

22 Claims, 7 Drawing Sheets

U.S. PATENT DOCUMENTS

| | | | |
|---|---|---|---|
| 5,805,816 | A | 9/1998 | Picazo, Jr. et al. |
| 5,903,568 | A | 5/1999 | Tanaka et al. |
| 6,052,383 | A | 4/2000 | Stoner et al. |
| 6,118,784 | A | 9/2000 | Tsuchiya et al. |
| 6,122,670 | A | 9/2000 | Bennett et al. |
| 6,187,708 | B1 | 2/2001 | Mignard et al. |
| 6,324,178 | B1 | 11/2001 | Lo et al. |
| 7,130,312 | B1 * | 10/2006 | Amagai et al. ............... 370/469 |
| 2001/0007122 | A1 * | 7/2001 | Cohen et al. ................ 711/153 |
| 2003/0193965 | A1 | 10/2003 | Higuchi et al. |

FOREIGN PATENT DOCUMENTS

| | | |
|---|---|---|
| JP | 61-63139 | 4/1986 |
| JP | 03-145242 | 6/1991 |
| JP | 03-294949 | 12/1991 |
| JP | 5-83300 | 4/1993 |
| JP | 06-52081 | 2/1994 |
| JP | 6-34486 | 5/1994 |
| JP | 7-143133 | 6/1995 |
| WO | WO 99/00935 | 1/1999 |

OTHER PUBLICATIONS

T. Amagai et al., co-pending U.S. Appl. No. 09/404,313, filed Sep. 24, 1999, "Packet Processing Apparatus, Packet Processing Method, and Packet Exchange".

* cited by examiner

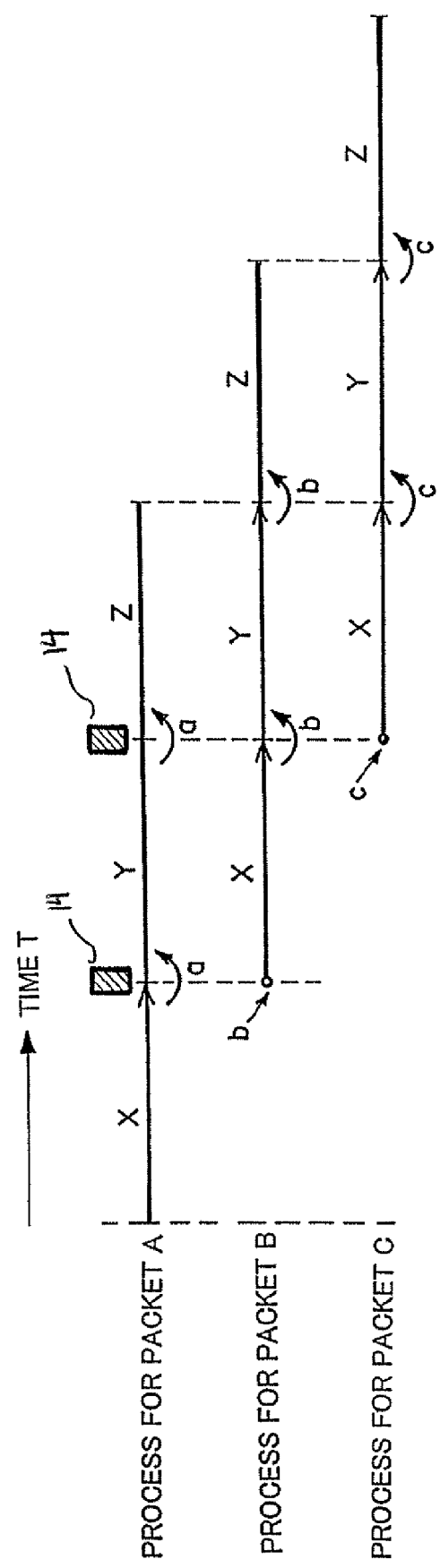

PACKET PROCESSING USING A MULTI-PORT MEMORY

RELATED APPLICATIONS

This application is a continuation of U.S. patent application Ser. No. 09/404,313 filed Sep 24, 1999, now U.S. Pat. No. 7,130,312, which claims priority under 35 U.S.C. 119 based on Japanese Patent Application No. 10-276161 filed Sep. 29, 1998, both of which are incorporated by reference herein.

BACKGROUND OF THE INVENTION

1. Field of the Invention

The present invention relates to a packet process, in particular, to a packet processing method, a packet processing apparatus, and a packet exchange that handle layer 2, layer 3, and so forth corresponding to the ISO reference model.

2. Description of the Related Art

In a communication network regardless of a wired system or a wireless system, various communication modes can be selected. With various communication modes, various services such as telephone, data communication, facsimile, and video communication are provided. In recent years, to allow the same interface to accommodate a plurality of terminals and an interface to be shared for various services, ITU (International Telecommunication Union) and ISO (International Organization for Standardization) that are international organizations have initiatively standardized a communication network and recommended OSI (Open System Interconnection) reference model.

In the OSI reference model, a plurality of protocols used in one communication session is categorized as seven layers that are defined as follows. Layer 1 is a physical layer in which electrical and mechanical conditions and procedures are managed for setting, maintaining, and canceling physical lines and a transmission of a bit sequence is assured. Layer 2 is a data link layer in which a data link is set between nodes connected with a communication line and a bit error on a transmission path is corrected. Layer 3 is a network layer in which a routing operation is performed through a communication network so as to connect the local system to a remote system.

Layer 4 is a transport layer in which an end-to-end transport connection is set and a transparent data transmission is performed so as to provide a server to a higher layer regardless of the quality of the communication network. Layer 5 is a session layer in which application processes are connected with sessions and communication modes such as full duplex mode and half duplex mode and synchronization mode and re-synchronization mode necessary for communications among processes are managed.

Layer 6 is a presentation layer in which a data format controlling operation for managing the structure of data received and transmitted between processes is performed. Layer 7 is an application layer that is the highest layer in which a user/application protocol corresponding to an object is executed. So far, various protocols have been structured corresponding each layer of the OSI reference model. Communications between exchanges, between an exchange and a terminal, and between computers are accomplished corresponding to the seven layers.

For example, a communication between computers is referred to as inter-system communication. A communication between processes of a computer is referred to as process communication. Layer 1 to layer 3 are protocols for inter-system communication. In reality, layer 1 is a layer in which data and each medium such as sound and picture are converted into electric signals and then transmitted. Layer 2 is a data link layer in which data transmissions among a terminal, an exchange, a node, and so forth are securely executed with high reliability. Layer 3 is a network layer in which mediums are transmitted and relayed between terminals, exchanges, nodes, and so forth through a plurality of networks.

For example, digital exchanges are categorized as a line exchange type and a packet exchange type, In addition, digital exchanges are further categorized as a subscriber line exchange and a relay exchange. The subscriber line exchange performs a relaying operation and an exchanging operation for a subscriber line connected to a subscriber terminal. The relay exchange performs a relaying operation and an exchanging operation for the subscriber line exchange through a transmission path. Layer 4 to layer 7, that are high function layers, are not necessary for a relaying operation and an exchanging operation. Thus, any exchange has a transfer layer structure corresponding to layers 1, 2, and 3. When an exchange is controlled corresponding to a computer program as a stored program control system, the computer searches a free line, updates transmission data at a proper timing with a high speed memory (such as semiconductor LSI memory), reads the data from the memory, and transmits the data to a relevant line.

Next, a packet exchanged between a layer 2 processing portion and a layer 3 processing portion of a packet exchange will be described. Conventionally, a packet is exchanged between the layer 2 processing portion 2 and the layer 3 processing portion corresponding to one of the following two methods.

(A) A packet memory of the layer 2 processing portion is accessed as a read/write operation for a packet stored therein by the layer 3 processing portion through a memory bus.

(B) A packet memory disposed on a control bus and written by the layer 2 processing portion having a DMA (Direct Memory Access) circuit is accessed for a packet stored therein as a read/write operation by the layer 3 processing portion through the memory bus.

The transfer layer function of the packet exchange is disclosed in Japanese Patent Laid-Open Publication No. 7-1431333. According to the related art reference, in a conventional layer structure system, when protocols of three layers of layer 1 (ATM), layer 2, and layer 3 are processed, a shared memory that stores user data that is input and output between a layer 1 protocol processing device and a line and data such as header information used for a protocol process of each layer is disposed so as to reduce the storage capacity of the memories of the system and alleviate the process capability of the system.

Each layer protocol processing device can access the shared memory. When a frame is transferred between layer 1 and layer 2 or a packet is transferred between layer 2 and layer 3, data stored in the shared memory is not directly transmitted. Instead, data is indirectly transferred with the top and last address values of the data stored in the shared memory. In other words, each transfer layer can access the shared memory through a bus. When necessary, since data can be read from the shared memory through the bus, the storage capacity of the shared memory can be remarkably reduced and thereby the process performance can be improved.

However, in each of the above-described methods (A) and (B), since the same memory bus is accessed from the layer 2 processing portion and the layer 3 processing portion, their processes cause to interfere with each other. Even if a bus contention arbitration controlling portion is disposed, the process performance deteriorates. In particular, when layer 2 is an ATM, since a complicated cell disassembling/assembling process and so forth are performed, a process delay due to memory access contention to layer 3 is more critical.

In the method (B), instead of the bus contention arbitration controlling portion, a packet memory that has a large storage capacity for a frame and a packet transferred in the layer 2 process is required. Thus, when a dual-port memory that is expensive is used, the cost of the product rises.

In layer 3, in most cases, only packet header information is processed. Thus, particularly, in the packet transferring process, it is preferred to store user data to a memory of the layer 2 processing portion and supply only header information to the layer 3 processing portion. At this point, when the layer 3 processing portion is connected to the same bus of the layer 2 processing portion, since their memory accessing processes contend and interfere, the process capability deteriorates.

SUMMARY OF THE INVENTION

The present invention is made from the above-described point of view. An object of the present invention is to provide a packet processing apparatus that allows the storage capacity of a memory to be reduced and a smooth pipeline process that is free from an access contention of a shared memory between different layer processes to be accomplished. Another object of the present invention is to allow packets to be transferred at high speed and various packet formats to be converted.

According to the present invention, in addition to a packet storing memory (packet memory), a dual-port memory is disposed as a shared memory. Thus, a memory access contention arbitrating circuit that arbitrates a memory access contention between layer 2 and layer 3 is omitted. In addition, a layer 2 reception processing portion copies information necessary for the process of layer 3 to the shared memory. Reception packet data is stored in a packet memory of the layer 2 reception processing portion. Thus, as the shared memory, a high-speed, low-storage-capacity memory can be used.

A first aspect of the present invention is a packet processing apparatus for converting packet data through a plurality of layers, comprising a packet memory for storing the entire packet, and a shared memory for storing part of each packet of the packet data used in processes of a lower layer processing portion and a higher layer processing portion, the lower layer processing portion and the higher layer processing portion accessing the same memory space of the shared memory through physically different memory buses.

A second aspect of the present invention is a packet processing apparatus for exchanging packet data through a plurality of layers, comprising a packet memory for storing the entire packet, and a shared memory as a multi-port memory for storing part of each packet of the packet data used in processes of a layer 2 processing portion as a data link layer and a layer 3 processing portion as a network layer, the layer 2 processing portion and the layer 3 processing portion accessing the same memory space of the shared memory.

The packet processing apparatus of the second aspect further comprises a layer 2 reception processing portion for storing only a field necessary for layer 3 or a higher layer to the packet memory and the shared memory.

The packet processing apparatus of the first aspect further comprises a layer 2 transmission processing portion for combining data stored in a plurality of packet memories and data stored in the shared memory and transmitting the resultant data as the packet.

A third aspect of the present invention is a packet processing method for exchanging packet data through a plurality of layers, comprising the steps of storing the entire packet to a packet memory, and storing part of each packet of the packet data used in processes of a lower layer processing portion and a higher layer processing portion of the plurality of layers to a multi-port shared memory, the lower layer processing portion and the higher layer processing portion accessing the same memory space of the multi-port shared memory.

A fourth aspect of the present invention is a packet processing method for exchanging packet data through a plurality of layers, comprising the steps of storing the entire packet to a packet memory, and storing part of each packet of the packet data used in processes of a layer 2 processing portion and a layer 3 processing portion to a multi-port shared memory, the layer 2 processing portion and the layer 3 processing portion accessing the same memory space of the multi-port shared memory.

In the packet processing method of the fourth aspect of the present invention, a pipeline processing system is used so that the layer 2 processing portion and the layer 3 processing portion access the shared memory without an interference.

A fifth aspect of the present invention is a packet exchange for exchanging packet data through a plurality of layers, comprising a packet memory for storing the entire packet, and a multi-port shared memory for storing part of each packet of the packet data used in processes of a lower layer processing portion and a higher layer processing portion of the plurality of layers, the lower layer processing portion and the higher layer processing portion accessing the same memory space of the multi-port shared memory.

A sixth aspect of the present invention is a packet exchange for exchanging packet data through a plurality of layers, comprising a packet memory for storing the entire packet, and a multi-port shared memory for storing part of each packet of the packet data used in processes of a layer 2 processing portion as a data link layer and a layer 3 processing portion as a network layer of the plurality of layers, the layer 2 processing portion and the layer 3 processing portion accessing the same memory space of the multi-port shared memory.

The packet exchange of the sixth aspect of the present invention further comprises a processor, connected to the layer 2 processing portion and the layer 3 processing portion, for executing a process of a layer higher than layer 3.

A seventh aspect of the present invention is a packet exchange for exchanging packet data through a plurality of layers, comprising a layer 2 reception processing portion for receiving a packet, storing the received packet to a packet memory, and storing a header portion of the received packet to a shared memory, a layer 3 processing portion for receiving the header portion, executing a network process corresponding to the header portion, updating the header portion when necessary, and storing the updated header portion to the same address of the shared memory, and a layer 2 transmission processing portion for combining the updated header portion received from the layer 3 processing portion and stored in the shared memory and packet information stored in the packet memory and transmitting the resultant data as a packet.

In the packet exchange of the seventh aspect of the present invention, the layer 2 transmission processing portion combines data updated by the layer 3 processing portion and stored in the shared memory and packet data stored in the packet memory, transmits the combined data, converts a packet format into a format of layer 1, and when layer 3 is an IP (Internet Protocol) layer, converts an IP V4 (Version 4) packet into an IP V 6 (Version 6) packet or vice versa.

In the packet exchange of the seventh aspect of the present invention, wherein the layer 2 transmission processing portion combines data updated by the layer 3 processing portion and stored in the shared memory and packet data stored in the packet memory by the layer 2 reception processing portion, and when layer 3 is an IP (Internet Protocol) layer, performs an IP V6 tunneling process for an IP V4 packet (namely, an IP V6 header is added to or deleted from an IP V4 packet), an IP V4 tuning process for an IP V6 packet (an IP V4 header is added to or deleted from an IP V6 packet), or an IP V4 tunneling process for an IP V4 packet (an IP V4 packet is added to or deleted from an IP V4 packet).

According to the present invention, since the layer 2 transmission processing portion freely combines data updated by the layer 3 processing portion and stored in the shared memory and packet data stored in the packet memory of the layer 2 reception processing portion and transmits the combined data, when data is transferred, a packet format can be freely converted (namely, a packet header can be updated, converted, deleted, and added).

According to the present invention, as an example of which a packet format conversion is required, when layer 3 is an IP protocol layer, an IP V4 packet can be converted into an IP V6 packet or vice versa (as a header conversion). In addition, an IP V6 tunning operation for an IP V4 packet can be easily performed (namely, an IP V6 header is added to or deleted from an IP V4 packet).

These and other objects, features and advantages of the present invention will become more apparent in light of the following detailed description of a best mode embodiment thereof, as illustrated in the accompanying drawings.

BRIEF DESCRIPTION OF DRAWINGS

FIG. 7 is a schematic diagram for explaining a pipeline operation of the packet processing apparatus according to a second embodiment of the present invention.

DESCRIPTION OF PREFERRED EMBODIMENTS

Next, with reference to the accompanying drawings, embodiments of the present invention will be described.

First Embodiment (Structure of First Embodiment)

Figure 1:
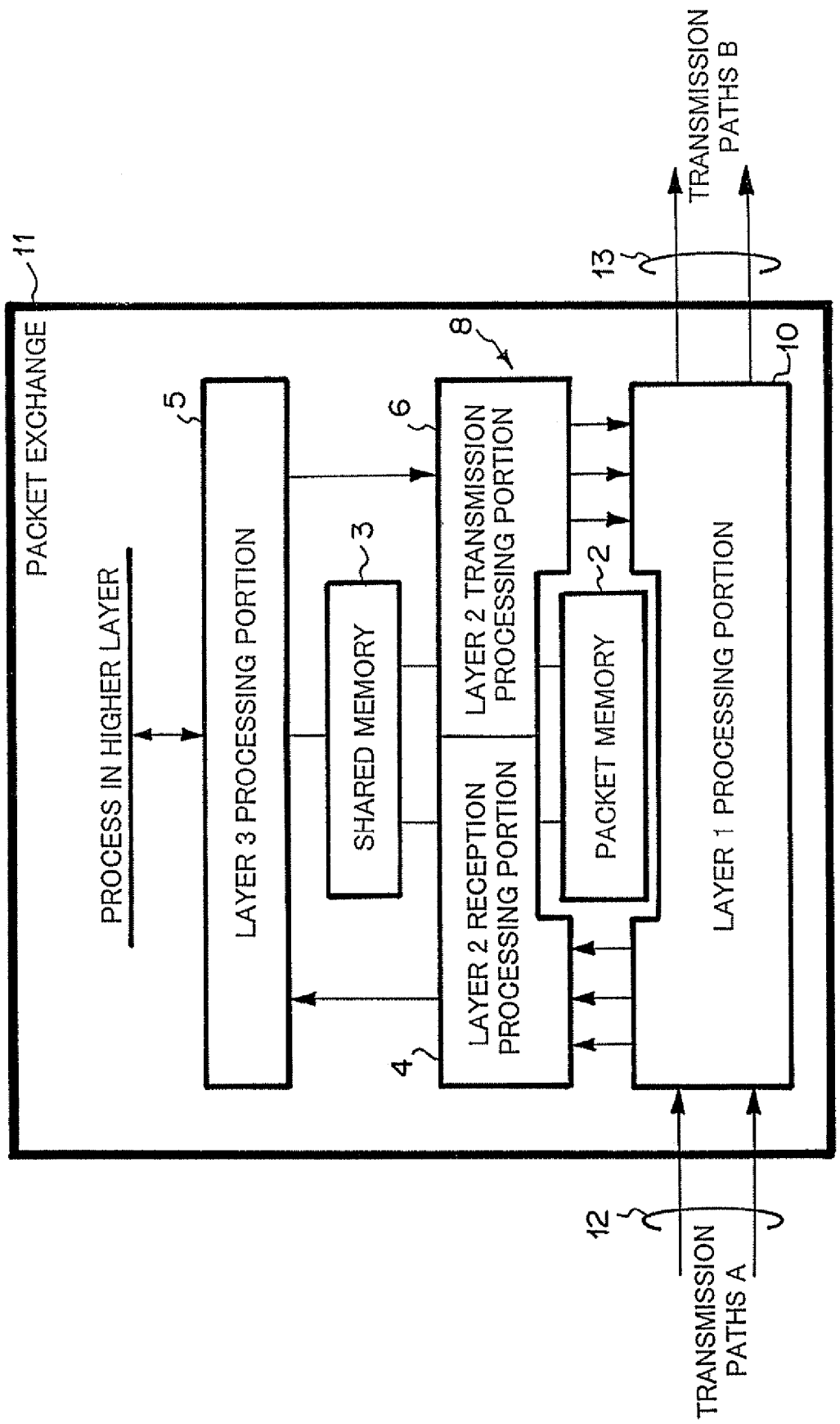
FIG. 1 is a block diagram showing the structure of a packet exchange according to a first embodiment of the present invention.

With reference to FIG. 1, a packet exchange 11 according to a first embodiment of the present invention will be described. Packet data is supplied from a plurality of transmission paths A12 to the packet exchange 11. The packet switch 11 performs network processes such as a routing process and a signaling process for the packet data received from the transmission paths A12 and sends the resultant packet data to transmission paths B13. In the packet exchange 11, a layer 1 processing portion 10 selects a transmission path of the physical layer and accurately transmits packet data to the selected transmission path. A layer 2 reception processing portion 4 stores received packet data to a packet memory 2 and stores a required header portion of the received packet data to a shared memory 3. A layer 3 processing portion 5 performs a process of layer 3.

In other words, when the packet data has a header portion to be updated, the layer 3 processing portion 5 updates the header portion and stores it to the shared memory 3. When necessary, a layer 2 transmission processing portion 6 deletes the header portion of the packet data stored in the packet memory 2, combines the user information portion of the packet data and the updated header portion, and transmits the resultant packet data to a transmission path B13 through a layer 1 processing portion 10. Next, the structure and operation of the packet switch according to the first embodiment will be described in detail.

Figure 2:
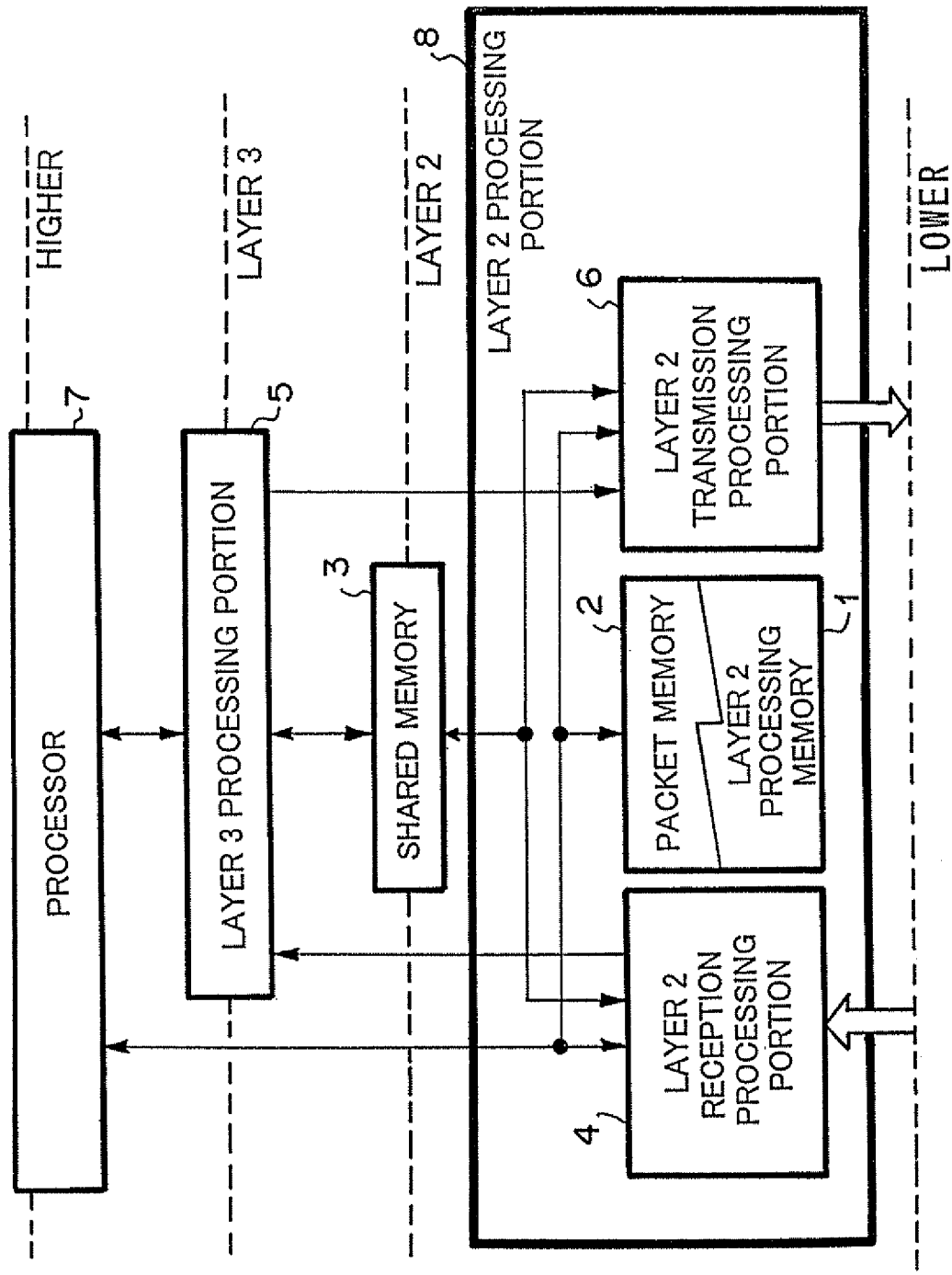
FIG. 2 is a block diagram showing the structure of a packet processing apparatus according to the first embodiment of the present invention.

FIG. 2 is a block diagram showing the structure of a packet processing apparatus of the packet exchange according to the first embodiment of the present invention. Referring to FIG. 2, reference numeral 1 is a memory area for controlling the process of layer 2 so as to process a data packet received from a lower layer. Reference numeral 2 is a packet memory area that stores packet data. Reference numeral 3 is a shared memory of layer 2 and layer 3. Reference numeral 4 is a layer 2 reception processing portion that receives data from layer 1 as a lower layer. Reference numeral 5 is a layer 3 processing portion that performs a routing process corresponding to the header portion of packet data.

Reference numeral 6 is a layer 2 transmission processing portion that transmits data to layer 1. Reference numeral 7 is a processor that controls the layer 2 processing portion and the layer 3 processing portion and performs a protocol process of layer 3 or a higher layer corresponding to an executable program.

Next, the structure of the packet processing apparatus shown in FIG. 2 will be practically described. Referring to FIG. 2, the packet processing apparatus comprises a layer 2 processing memory 1, a large storage capacity packet memory 2, a shared memory 3, a layer 2 reception processing portion 4, a layer 3 processing portion 5, a layer 2 transmission processing portion 6, and a processor 7. The layer 2 processing memory 1 manages and stores layer 2 process information of a transmission/reception packet.

The large storage capacity packet memory 2 stores the transmission/reception packet. The shared memory 3 is a high-speed, small-storage-capacity dual port memory that the layer 2 processing portion and the layer 3 processing portion independently access. The layer 2 reception processing portion 4 copies information necessary and sufficient for the layer 3 processing portion (the information is for example the packet header of the reception packet and reception connection data) to the shared memory 3. The layer 3 processing portion 5 performs the process of layer 3 or a higher layer, informs the layer 2 processing portion of difference information with the reception packet so as to transfer a packet, and causes and starts a transmitting process.

The layer 2 transmission processing portion 6 combines data (new packet header) stored in the shared memory and reception packet data stored in the packet memory and edits/structures a transmission packet so as to perform a packet transferring process. The processor 7 performs a more complicated process than the layer 3 processing portion (more higher process).

Figure 3:
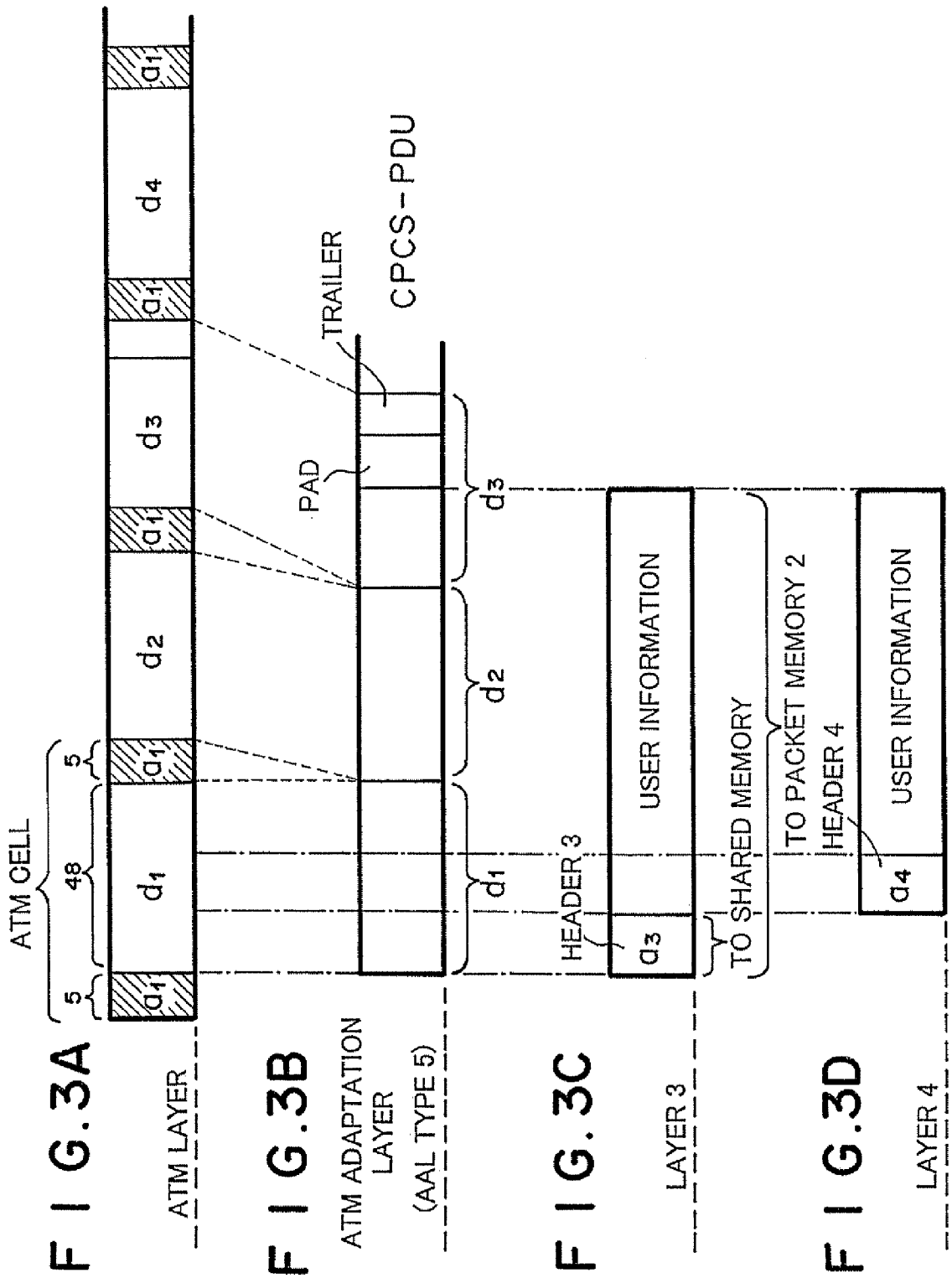
FIGS. 3A to 3D are schematic diagrams showing a data structure according to the first embodiment of the present invention.

Next, with reference to ATM (Asynchronous Transfer Mode) shown in FIG. 3, a method for separating packet data into the packet memory and the shared memory will be described. Referring to FIG. 3, in the ATM layer, ATM cells a1+d1, a1+d2, . . . (where a represents a header portion of 5 bytes; b represents a data portion of 48 bytes) are successively transmitted through a physical layer process.

An AAL (ATM Adaptation Layer) 5 disassembles user information into ATM cells and assembles cells to user information. The AAL 5 has a function equivalent to layer 2 of the OSI reference model. The AAL 5 is composed of an SAR (Segmentation And Re-assembly) sub-layer, a CPCS (Common Part Convergence Sub-layer), and an SSCS (Service Specific Convergence Sub-layer). As shown in FIG. 3B, a CPCS-PDU (Protocol Data Unit) is composed of a pad and a trailer for detecting an error. As shown in FIG. 3C, in layer 3, packet data is converted into a packet header portion 3 and a data portion. According to the first embodiment, the data structure in layer 3 is stored to the packet memory 2 shown in FIG. 2. In layer 4, packet data is processed as a header portion 4 and user information. In a higher layer, a header portion and the remaining user information are successively processed. According to the first embodiment of the present invention, the header portion 3 and the user information of layer 3 are stored to the packet memory 2. The header portion 3 of layer 3 and (when necessary) the header 4 of layer 4 are stored to the shared memory 3.

Figure 4:
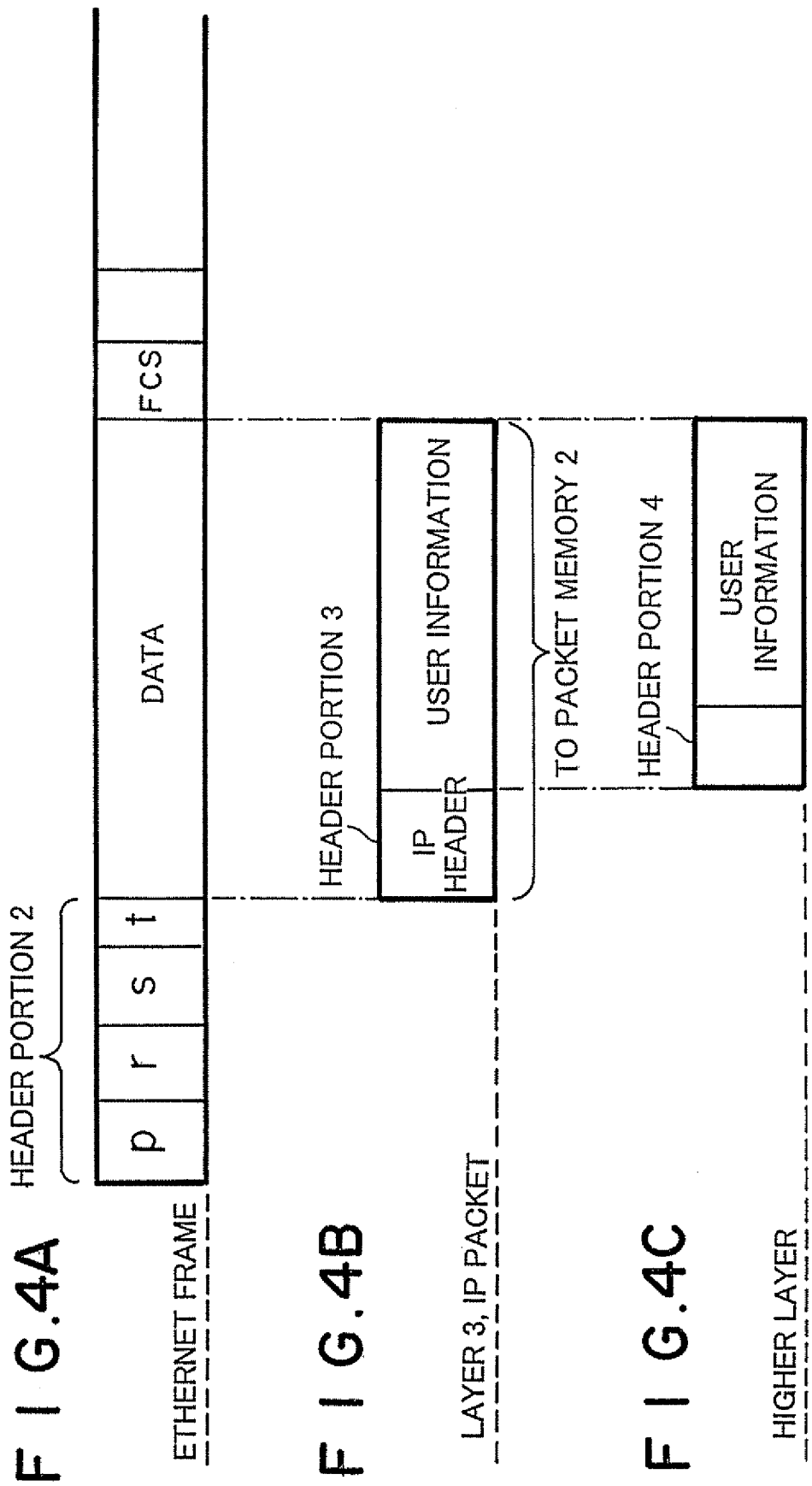
FIGS. 4A to 4C are schematic diagrams showing a data structure according to the first embodiment of the present invention.

Next, with reference to FIGS. 4A, 4B, and 4C, a data structure corresponding to Ethernet protocol will be described. In FIGS. 4A, 4B, and 4C, a header portion 2 of an Ethernet frame is composed of a preamble portion p (8 bytes), a destination address portion r (6 bytes), a source address portions (6 bytes), and a frame type portion t (2 bytes). Thus, the header portion 2 is composed of a total of 22 bytes. The Ethernet frame is composed of the header portion 2, a variable-length data portion, and a frame check sequence (FCS) (4 bytes). As shown in FIG. 4B, an IP packet in layer 3 is composed of an IP header and user information. In a higher layer, a data structure having a header portion 4 and user information is used. In addition, as shown in FIG. 4B, the header portion 3 of the IP header portion and user information are stored to the packet memory shown in FIG. 2. The header portion 2 and the header portion 3 are stored to the shared memory 3.

The data structure according to the first embodiment of the present invention can be applied to an ATM network, an Ethernet network, and other data networks. In addition, the data structure according to the first embodiment can be used in a combination of such networks.

(Operation of First Embodiment)

Referring to FIG. 2, when the layer 2 reception processing portion 4 receives a packet from layer 1, the layer 2 reception processing portion 4 obtains the start address of an empty packet buffer from an empty packet buffer management field of the layer 2 processing memory 1. While the layer 2 reception processing portion 4 is writing the received packet data to the obtained start address of the packet buffer, the layer 2 reception processing portion 4 copies only a field (packet header) necessary for the protocol process of layer 3 to the shared memory 3.

After the layer 2 reception processing portion 4 has completed the process of layer 2, the layer 3 processing portion 5 performs the process of layer 3 corresponding to the address of the shared memory 3 received from the layer 2 reception processing portion 4. For example, the layer 3 processing portion searches the content of a pre-notified communication network from the header portion 3 stored in the shared memory 3, performs an optimum routing process, provides a connection to the destination system, and updates the header portion. When a process in a higher layer is required, the layer 3 processing portion 5 sends the user information to the higher layer. After the higher layer has completed the process for the user information, the layer 3 processing portion changes the header portion for the user data and sends the changed header portion to layer 2.

For example, according to TCP/IP (Transmission Control Protocol/Internet Protocol), a datagram type IP protocol as a function of layer 3 that is a network layer assures a bidirectional communication corresponding to TCP protocol as a function of layer 4 that is a transport layer. In LAN (Local Area Network), Ethernet, FDDI (ring type LAN of 100 Mbits/sec), or the like is used as a lower layer of TCP/IP.

According to the first embodiment of the present invention, to prevent the layer 2 processing portion 8 and the layer 3 processing portion 5 from contending in accessing the memory bus, the shared memory 3 is a dual-port memory.

The dual-port memory is composed of a first port data bus, a first port address bus, a second port data bus, a second port address bus, and a controlling circuit. The controlling circuit controls connections of memory cells and data buses through the address buses. According to the first embodiment of the present invention, since the same address is not accessed at a time, no contention substantially takes place. Thus, an arbiter circuit that prevents a contention from taking place is not required in a pipe-line operation.

Figure 5:
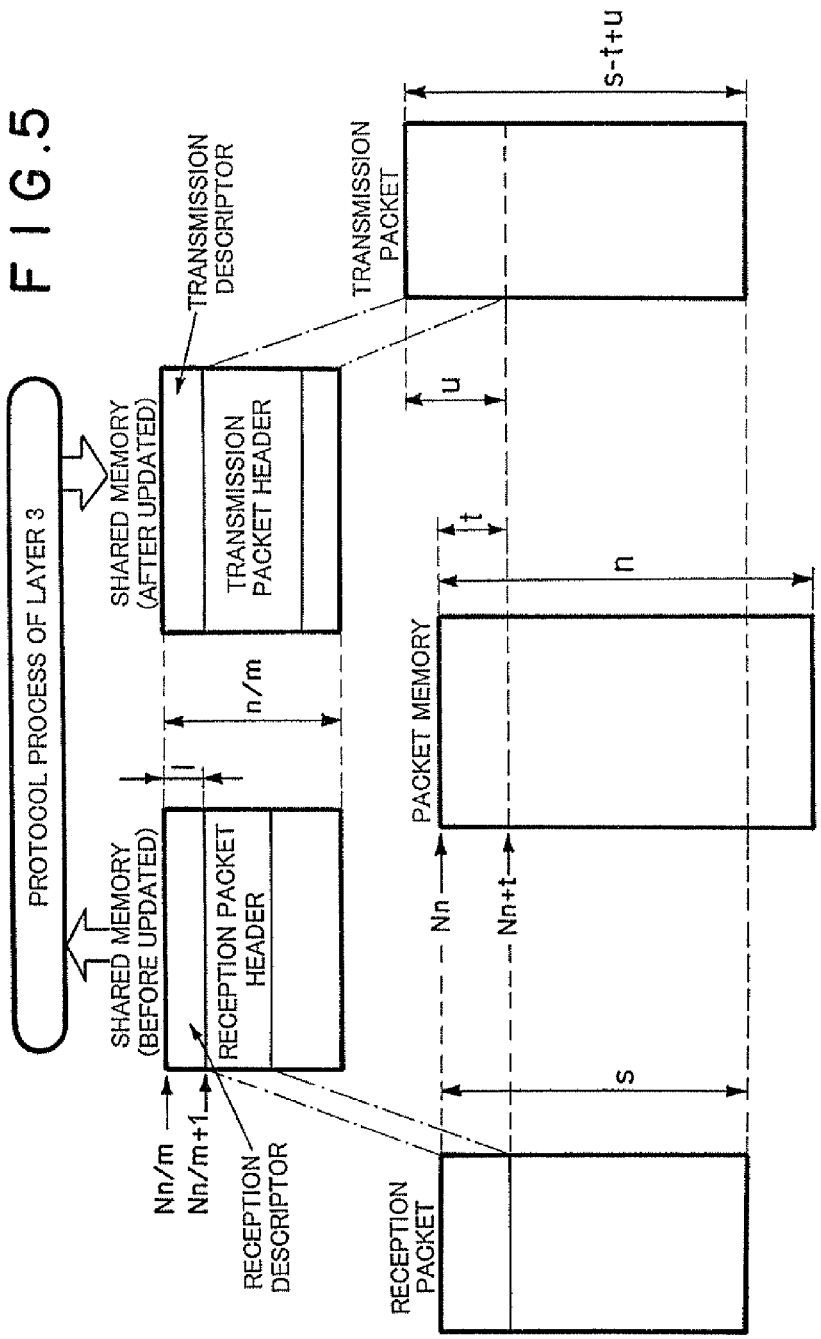
FIG. 5 is a schematic diagram for explaining the operation of the packet processing apparatus according to the first embodiment of the present invention.

FIG. 5 is a schematic diagram showing an outline of a packet transferring process. Referring to FIG. 5, the layer 2 reception processing portion 4 receives a packet whose packet length is s and whose header length is t. The layer 2 reception processing portion 4 stores the packet to the packet memory 2 and copies it to the shared memory.

Thereafter, the layer 3 processing portion 5 executes the protocol process of layer 3 corresponding to the packet header of the packet copied to the shared memory 3 and updates the packet header of the packet stored in the shared memory 3 to a new packet header whose length is u. Thereafter, the layer 2 transmission processing portion 6 combines the packet header whose length is u updated by the layer 3 processing portion 5 and stored in the shared memory 3 and packet data whose length is s−t excluding the packet header stored in the packet memory and transfers the resultant data to layer 1. At this point, the transmission packet whose size is (s−t+u) is transferred against the reception packet whose size is s. The values t and u may sometimes 0.

Figure 6:
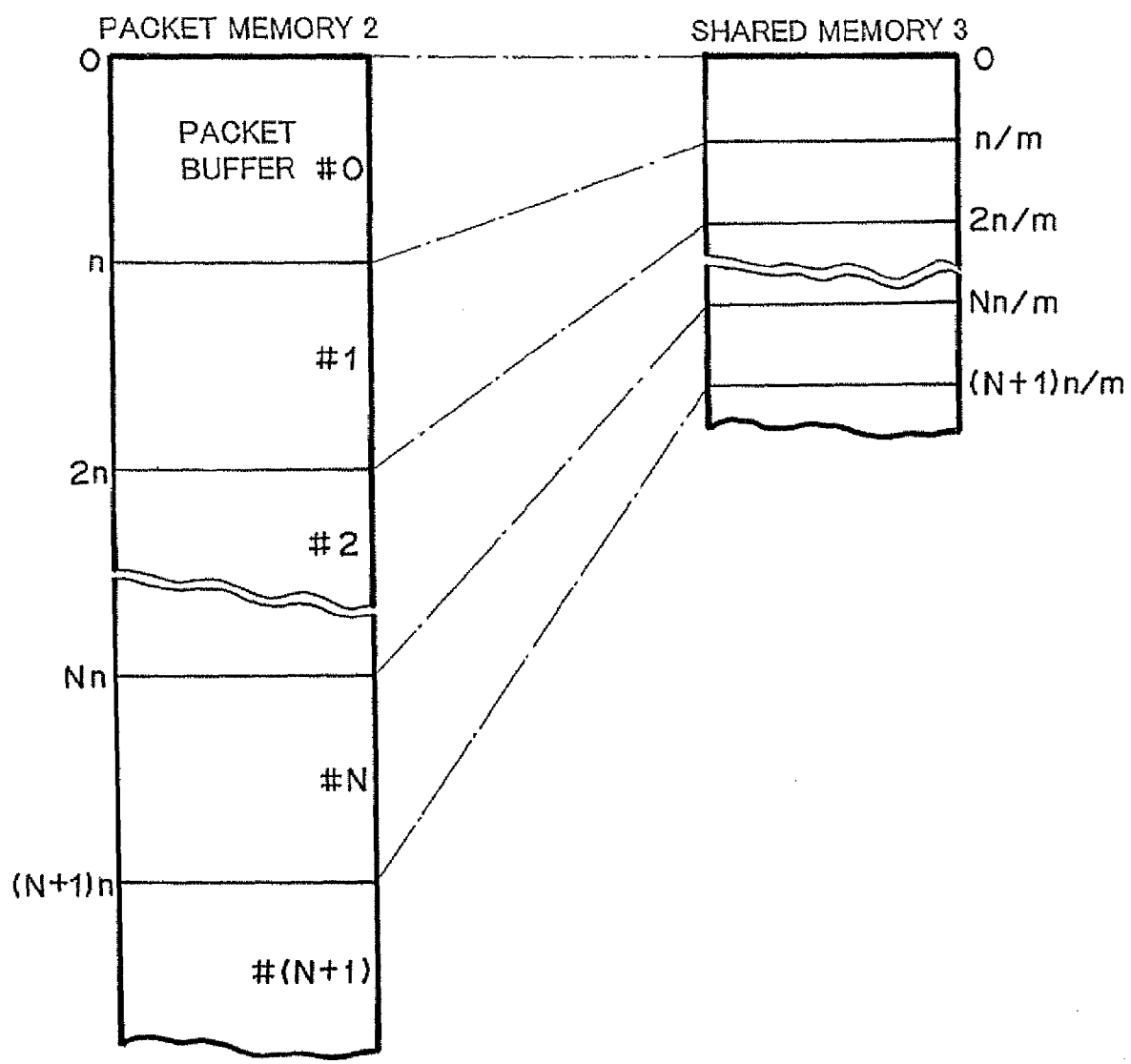
FIG. 6 is a schematic diagram showing the relation between memories of the packet processing apparatus according to the first embodiment of the present invention.

Next, the dividing method of the memory spaces of the shared memory 3 and the packet memory 2 will be described. As shown in FIG. 6, the memory spaces of the shared memory 3 and the packet memory 2 are correlated. The start address of a buffer that stores a packet to be processed easily represents a memory space of the shared memory 3 that processes the packet (or vice versa) so as to effectively perform the relevant process.

FIG. 6 is a schematic diagram showing an example of divided memory spaces of the packet memory 2 and the shared memory 3 whose storage capacity is 1/m of the packet memory 2. Referring to FIG. 6, the packet memory 2 requires n bytes of the memory space for processing one packet, whereas the shared memory 3 requires n/m bytes of the memory space for processing one packet. Thus, 1/m of the start address Nn of the packet buffer #N is the start address Nn/m of the memory space of the shared memory 3. When one byte after the start address for each memory space of the shared memory 3 is used as a field for information necessary for transmitting/receiving a packet (this field is referred to as descriptor), the start address of each memory space for a packet header of the shared memory 3 is (Nn/m+1). Thus, the correlation between the buffer memory 2 and the shared memory 3 can be easily obtained and used.

Next, the operation of the first embodiment will be described in detail. When the layer 2 reception processing portion 4 receives a new packet, the layer 2 reception processing portion 4 stores the packet data to a memory space of the packet memory 2 corresponding to the start address Nn read from an empty packet buffer management field of the layer 2 processing memory 1. In addition, while the layer 2 reception processing portion 4 is storing the reception packet to the packet memory 2, the layer 2 reception processing portion 4 copies part (such as the packet header portion) of the reception packet data necessary for the process of layer 3 to a memory space whose start address is (Nn/m+1) of the shared memory 3.

After the layer 2 reception processing portion 4 has received the packet, the layer 2 reception processing portion 4 writes information such as the reception packet length s to the descriptor field whose length is 1 and whose start address is Nn/m of the shared memory 3. Thereafter, the layer 2 reception processing portion 4 informs the layer 3 processing portion 5 of the address information (Nn/m) so that the layer 3 processing portion 5 processes the packet. Thereafter, the layer 2 reception processing portion 4 receives a new packet.

The layer 3 processing portion 5 read-accesses the shared memory 3 corresponding to the address Nn/m received from the layer 2 reception processing portion 4 and performs various processes of layer 3 (for example, a checking operation for the normality of the packet header, a searching operation for the routing table, and a converting operation for a network address).

In the case that the layer 3 processing portion 5 has decided to transfer the relevant packet, when necessary, the layer 3 processing portion 5 rewrites the packet header copied to the shared memory 3 by the layer 2 reception processing portion 4 to a packet header to be transmitted. In addition, the layer 3 processing portion 5 writes information such as difference information with the reception packet stored to the packet memory 2 by the layer 2 reception processing portion 4 (for example, the header length t to be deleted from the reception packet, the length u of the new packet header to be added, the destination physical port, the logical channel, and so forth) to the descriptor field and informs the layer 2 transmission processing portion 6 of the address Nn/m of the shared memory 3.

Thus, the layer 2 transmission processing portion 6 processes the packet. Thereafter, the layer 3 processing portion 5 receives a new packet and processes it.

In addition, the layer 2 transmission processing portion 6 reads the descriptor field corresponding to the address Nn/m of the shared memory 3 received from the layer 3 processing portion 5, combines the new packet header stored in the shared memory 3 and the reception packet data stored in the packet memory 2 corresponding to the difference information with the reception packet written in the descriptor field, forms a transmission packet, and transmits it to a designated physical port and a designated logical channel.

At this point, the start address of the packet header read from the shared memory 3 is Nn/m+1. The length of the packet header is u. The start address of the packet data read from the packet memory 2 is Nn+t. The length of the packet data is (s−t). The transmission frame length is (s−t+u).

After the layer 2 transmission processing portion 6 has transmitted the packet, it writes the start address (Nn) of the packet buffer that is free in the packet memory 2 to an empty packet buffer management field of the layer 2 processing memory 1 so that the free memory space of the packet memory 2 and the free memory space of the shared memory can be used for another packet process. After the layer 2 transmission processing portion 6 has written the address to the empty packet buffer management field of the layer 2 processing memory 1, the layer 2 transmission processing portion 6 obtains new address information and starts the transmitting process for the next new packet.

The transferring process is performed in such a manner. However, when the layer 3 has not decided to transfer the packet, has determined that the packet has been addressed to the local unit, or has determined that a more complicated process is required for the packet, the layer 3 processing portion may inform the processor 7 rather than the layer 2 transmission processing portion 2 of the address Nn/m so that the processor 7 processes the packet. At this point, the processor 7 can access all the layer processing portions and all the memory spaces, read the reception descriptors, read all packets from the packet memory 2 through connected data bus and address bus, process them, and terminate them.

In addition, the processor 7 can write a transmission packet to the packet memory 2, set the transmission descriptor, and starts the packet transmitting process skipping the layer 3 processing portion 5.

With respect to IP addresses, in IP V4 (version 4) format, a 32-bit fixed specific address form at is used. To increase the number of domain names that can be assigned, IP V6 (version 6) format that supports 128-bit network addresses has been increasingly used. In this situation, when IP V4 format packet data is converted into IP V6 format packet data, the layer 2 reception processing portion 4 stores packet data to the packet memory 2 and transfers the IP V4 header portion of the packet data to the shared memory 3. The layer 3 processing portion 5 receives the IP V4 header portion, analyzes it, and creates an IP V6 header portion. The layer 2 transmission processing portion 6 receives a process end message from the layer 3 processing portion 5, the layer 2 transmission processing portion 6 combines the IP V6 header portion stored in the shared memory 3 and relevant packet data stored in the packet memory 2 and sends the resultant data to layer 1. In addition to the header format conversion from the IP V4 format to the IP V6 format, a header format conversion from the IP V6 format to the IP V4 format can be performed. Likewise, a header format conversion from the IP V6 format to the IP V6 format and a header format conversion from the IP V4 format to the IP V4 format can be performed.

Next, an IP V6 tunneling function for an IP V4 packet of the packet exchange according to the first embodiment will be described. The layer 2 reception processing portion 4 stores received IP V4 packet data to the packet memory 2. In addition, the layer 2 reception processing portion 4 stores the IP V4 header portion to the shared memory 3. Thereafter, the layer 2 reception processing portion 4 informs the layer 3 processing portion 5 of the completion of the process. The layer 3 processing portion 5 creates an IP V6 header portion, adds it to the IP V4 header portion, substitutes the IP V4 packet data with the IP V6 packet data in the shared memory 3. When the IP protocol requires a process in a higher layer, for example, the processor 7 performs the process of layer 4 or a higher layer and returns the result to the layer 3 processing portion 5. Thereafter, the layer 3 processing portion 5 informs the layer 2 transmission processing portion 6 of the completion of the process.

The layer 2 transmission processing portion 6 reads the header portion information of which the IP V6 header portion has been added to the IP V4 header portion from the address that represents the completion of the process and that is stored in the shared memory 3, combines the header portion information and the relevant packet data, and sends the resultant data to layer 1 (physical layer).

As another method for the tunneling function, the layer 2 reception processing portion 4 stores the received IP V4 packet data to the packet memory 2, stores the IP V4 header portion of the packet data to the shared memory 3, and informs the layer 3 processing portion 5 of the completion of the process. The layer 3 processing portion 5 creates an IP V6 header portion corresponding to the IP protocol and adds the IP V6 header portion to the IP V4 header portion stored in the shared memory 3. When the IP protocol requires the process of a higher layer, for example, the processor 7 performs the process of layer 4 or a higher layer and returns the resultant data to the layer 3 processing portion 5. The layer 3 processing portion 5 informs the layer 2 transmission processing portion 6 of the completion of the process.

The layer 2 transmission processing portion 6 reads the IP V4 header portion and the IP V6 header portion from the address that represents the completion of the process and that is stored in the shared memory 3, combines the header portions and the relevant packet data, and sends the resultant data to the layer 1 (physical layer).

As another method, the layer 2 reception processing portion 4 stores the IP V4 header portion to the shared memory 3 and informs the layer 3 processing portion 5 of the completion of the process. The layer 3 processing portion 5 deletes the IP V4 header portion from the shared memory 3 corresponding to the IP protocol. In addition, the layer 3 processing portion 5 creates an IP V6 header portion and writes the IP V6 header portion to the shared memory 3. Thereafter, the layer 3 processing portion 5 informs the layer 2 transmission processing portion 6 of the completion of the process. The layer 2 transmission processing portion 6 reads the IP V6 header portion from a relevant address of the shared memory 3, combines the IP V6 header portion and the packet data with the relevant IP V4 header portion, and sends the resultant data to layer 1 (physical layer).

Thus, the layer 2 transmission processing portion 6 combines data updated by the layer 3 processing portion 5 and the packet data stored in the packet memory 2 by the layer 2 reception processing portion 4 and transmits the combined data. Thus, the IP V4 packet is transmitted to an exchange corresponding to IP V4, skipping an IP V6 exchange.

In this case, when layer 3 is an IP (Internet Protocol) layer, an IP V6 tuning process for an IP V4 packet can be performed (in other words, an IP V6 header can be added to or deleted from an IP V4 packet) In addition, an IP V4 tuning process for an IP V6 packet can be performed (in other words, an IP V4 header can be added to or deleted from an IP V6 packet). Moreover, an IP V4 tuning process for an IP V4 packet can be performed (in other words, an IP V4 header can be added to or deleted from an IP V4 packet).

Second Embodiment

The structure of a packet processing apparatus according to a second embodiment of the present invention is the same as that according to the first embodiment shown in FIG. 2. According to the second embodiment, there are two methods of which the layer 2 reception processing portion 4 copies data to the shared memory 3. As a first method, the layer 2 reception processing portion 4 determines the protocol type of a higher layer and extracts a field corresponding to the determined result. As a second method, the layer 2 reception processing portion 4 extracts fixed length data from the beginning of a packet rather than considering the protocol type of a higher layer.

FIG. 7 is a schematic diagram for explaining a pipeline operation according to the second embodiment of the present invention. Referring to FIG. 7, as a process for a reception packet A, the operations of the layer 2 reception processing portion 4, the layer 3 processing portion 5, and the layer 2 transmission processing portion 6 are denoted in a time sequence by X, Y, and Z, respectively. The process for the reception packet A is followed by the processes for reception packets B and C. While the layer 2 transmission processing portion 6 is processing the packet A (as the operation Z), the layer 3 processing portion 3 processes the packet B (as the operation Y).

In addition, the layer 2 reception processing portion 4 processes the packet C (as the operation X). Although the operation Z of the packet A, the operation Y of the packet B, and the operation X of the packet C are executed at the same time, the memory space of the packet memory 2 is different from the memory space of the shared memory 3. Thus, these operations do not contend in memory spaces. In addition, since the layer 2 processing portion and the layer 2 processing portion are connected to the shared memory 3 through physically different memory buses, no contention takes place on the memory buses without need to arbitrate the operation Z for the packet A, the operation Y for the packet B, and the operation X for the packet C. Consequently, these operations can be independently performed.

In FIG. 7, while the packet A is being processed, when the operation X is advanced to the operation Y at time (a) and when the operation Y is advanced to the operation Z at time (a), buffers 14 represented by hatched square portions may be used. This applies to the processes for the packets B and C at time (b) and (c), respectively. These buffers further prevent the processes from contending.

In reality, the process time varies for each packet and for each process type. Address information as a trigger of the operation of each processing block may be buffered (queued) to the buffers 14 so as to adjust the speeds of the processing blocks. In addition, in each processing block, the similar pipeline operation and the speed adjustment can be performed.

In the above-described embodiments, a dual-port memory was used for the shared memory 3. Instead, a multi-port memory (such as a three-port memory or an eight-port memory) may be used so as to perform a pipeline operation including the processor 7.

In the above-described TCP/IP protocol, the layer 3 processing portion 5 may process a packet header portion of layer 4 such as TCP (Transmission Control Protocol) as well as a packet header portion of layer 3.

Address information exchanged in each layer process may be for example a descriptor address rather than the start address of a packet buffer of the packet memory 2.

In addition, as a method for correlating different memory spaces, for example, a table searching method may be used instead of a multiplying method.

According to the above-described embodiments, the layer 3 processing portion 5 designates difference information for each reception packet so as to convert ATM packet format into TCP/IP packet format or vice versa. Instead, when a format converting method for a reception/transmission packet is predetermined, fixed difference information may be designated. Thus, the process for designating difference information for each packet can be omitted from the processes performed by the layer 3 processing portion.

According to the present invention, since data exchanged among the layer 2 reception processing portion, the layer 3 processing portion, and the layer 2 transmission processing portion is only address information that represents a plurality of memory spaces. Thus, redundant data is not transferred between memories. Thus, the processes can be performed at high speed and the storage capacity of the memories can be reduced.

When each of the layer 2 reception processing portion, the layer 3 processing portion, the layer 2 transmission processing portion, and the processor portion has informed the next processing block of a relevant address, each process block can process a new packet. In addition, since the information that is directly exchanged is only address information, the amount of information is small. Thus, since the operation of each processing block can be buffered, its speed can be easily adjusted. Consequently, a pipeline process can be smoothly performed.

In addition, since information that is indirectly exchanged between the layer 2 processing portion and the layer 3 processing portion through the shared memory is only necessary information such as a packet header, the storage capacity of the shared memory can be reduced.

In addition, since the shared memory is a dual-port memory and the layer 2 processing portion and the layer 3 processing portion access the shared memory corresponding to address information exchanged between the layer 2 processing portion and the layer 3 processing portion, the memory bus and the same address field can be prevented from contending between the processes of layer 2 and layer 3 without need to use a special arbiter circuit. Since each process does not interfere, the process speed increases.

Since the layer 2 transmission processing portion combines data released from layer 3 and stored in the shared memory and reception data stored in the packet memory by the layer 2 reception processing portion in various combinations and transmits the resultant data, while the layer 2 transmitting portion is transmitting a packet, it can perform various processes such as packet format conversion and higher protocol conversion.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A packet processing method for exchanging packet data through a plurality of layers recommended by an Open System Interconnection reference model, comprising:
   receiving a packet at a lower layer processing portion;
   storing, via the lower layer processing portion, the packet into a packet memory;
   storing, via the lower layer processing portion, part of the packet used in processes performed by the lower layer processing portion and a higher layer processing portion into a multi-port shared memory, the lower layer processing portion and the higher layer processing portion accessing a same memory space of the multi-port shared memory via different memory buses;
   retrieving, via the higher layer processing portion, the part of the packet from the multi-port shared memory;
   processing, via the higher layer processing portion, the part of the packet to create an updated part;
   storing, via the higher layer processing portion, the updated part into the multi-port shared memory;
   retrieving, via the lower layer processing portion, the updated part from the multi-port shared memory;
   appending, via the lower layer processing portion, the updated part to the packet to create a new packet; and
   transmitting the new packet.

2. The packet processing method of claim 1 wherein the lower layer processing portion includes a layer 2 processing portion.

3. The packet processing method of claim 2 wherein the higher layer processing portion includes a layer 3 processing portion.

4. The packet processing method of claim 1 wherein the part of the packet includes a header portion of the packet.

5. The packet processing method of claim 1 wherein the storing a packet includes:
   storing the packet at a first memory location in the packet memory, and
   wherein the storing the part of the packet includes:
      storing the part of the packet in a second memory location in the multi-port shared memory, where the second memory location relates to the first memory location.

6. A device comprising:
   a packet memory to store a packet;
   a multi-port shared memory to store a part of the packet;
   a lower layer processing portion to:
      store the packet in the packet memory,
      store the part of the packet in the multi-port shared memory, and
      perform lower layer processing on the packet; and
   a higher layer processing portion to:
      read the part of the packet from the multi-port shared memory, and
      perform higher layer processing using the part of the packet,
   the lower layer processing portion and the higher layer processing portion accessing a same memory space of the multi-port shared memory via different memory buses.

7. The device of claim 6 wherein the multi-port shared memory includes a dual port memory.

8. The device of claim 6 wherein the packet memory includes a plurality of first memory spaces and the multi-port shared memory includes a plurality of second memory spaces, the plurality of second memory spaces corresponding to the plurality of first memory spaces.

9. The device of claim 6 wherein the lower layer processing portion includes a layer 2 processing portion.

10. The device of claim 9 wherein the higher layer processing portion includes a layer 3 processing portion.

11. The device of claim 6 wherein the part of the packet includes a header portion of the packet.

12. The device of claim 6 wherein, when storing the part of the packet in the multi-port shared memory, the lower layer processing portion is configured to:
   extract the part of the packet based on a protocol type of the higher layer processing portion or another higher layer processing portion, and
   store the extracted part of the packet in the multi-port shared memory.

13. The device of claim 6 wherein, when storing a part of the packet in the multi-port shared memory, the lower layer processing portion is configured to:
   extract a fixed length portion of the packet, and store the fixed length portion of the packet in the multi-port shared memory.

14. The device of claim 6 further comprising:
a processor, connected to the lower layer processing portion and the higher layer processing portion, to execute a process at a layer higher than the higher layer processing.

15. A device comprising:
a packet memory;
a multi-port shared memory;
a lower layer processing portion that connects to the multi-port shared memory via a first bus, the lower layer processing portion being configured to:
 store a packet in the packet memory,
 store a portion of the packet in the multi-port shared memory, and
 perform lower layer processing on the packet; and
a higher layer processing portion that connects to the multi-port shared memory via a second bus, the second bus being different than the first bus, the higher layer processing portion being configured to:
 read the portion of the packet from the multi-port shared memory, and
 perform higher layer processing using the portion of the packet.

16. The device of claim 15 wherein the multi-port shared memory includes a dual port memory.

17. The device of claim 15 wherein the packet memory includes a plurality of first memory spaces and the multi-port shared memory includes a plurality of second memory spaces, the plurality of second memory spaces corresponding to the plurality of first memory spaces.

18. The device of claim 15 wherein the lower layer processing portion includes a layer 2 processing portion.

19. The device of claim 18 wherein the higher layer processing portion includes a layer 3 processing portion.

20. The device of claim 15 wherein the portion of the packet includes a header portion of the packet.

21. The device of claim 15 wherein, when storing a portion of the packet in the multi-port shared memory, the lower layer processing portion is configured to:
 extract the portion of the packet based on a protocol type of the higher layer processing portion or another higher layer processing portion, and
 store the extracted portion of the packet in the multi-port shared memory.

22. The device of claim 15 wherein, when storing a portion of the packet in the multi-port shared memory, the lower layer processing portion is configured to:
 extract a fixed length portion of the packet, and
 store the fixed length portion of the packet in the multi-port shared memory.

* * * * *